United States Patent
Böhm

(10) Patent No.: US 11,303,518 B2
(45) Date of Patent: Apr. 12, 2022

(54) SYSTEM AND METHOD FOR CHECKING SYSTEM REQUIREMENTS OF CYBER-PHYSICAL SYSTEMS

(71) Applicant: Siemens Aktiengesellschaft, Munich (DE)

(72) Inventor: Birthe Böhm, Nuremberg (DE)

(73) Assignee: SIEMENS AKTIENGESELLSCHAFT, Munich (DE)

( * ) Notice: Subject to any disclaimer, the term of this patent is extended or adjusted under 35 U.S.C. 154(b) by 0 days.

(21) Appl. No.: 16/794,483

(22) Filed: Feb. 19, 2020

(65) Prior Publication Data

US 2020/0274768 A1 Aug. 27, 2020

(30) Foreign Application Priority Data

Feb. 21, 2019 (EP) ..................................... 19158513

(51) Int. Cl.
*G06F 15/177* (2006.01)
*H04L 41/084* (2022.01)
*H04L 41/0873* (2022.01)

(52) U.S. Cl.
CPC ...... *H04L 41/0846* (2013.01); *H04L 41/0873* (2013.01)

(58) Field of Classification Search
CPC ............ H04L 41/0846; H04L 41/0873; G05B 19/41885; G06F 11/1415; G06F 30/20; G06F 30/27; Y02P 90/02
See application file for complete search history.

(56) References Cited

U.S. PATENT DOCUMENTS

2017/0308067 A1 10/2017 Lamparter et al.
2018/0164759 A1 6/2018 Hoffmann et al.
(Continued)

FOREIGN PATENT DOCUMENTS

CN 104932464 A 9/2015
CN 108428477 A 8/2018
(Continued)

OTHER PUBLICATIONS

Digital twin-based smart production management and control framework for the complex product assembly shop-floor (Year: 2017).*
(Continued)

*Primary Examiner* — Anh Nguyen
(74) *Attorney, Agent, or Firm* — Schmeiser, Olsen & Watts LLP

(57) ABSTRACT

Provided is a method for checking system requirements of cyber-physical systems in a composite system, including creating a digital twin for at least one cyber-physical in each case; stipulating system requirements for each of the cyber-physical systems; storing the system requirements of the cyber-physical systems directly and/or indirectly in those digital twins which are each assigned to the cyber-physical system; and linking at least two or more digital twins The linked digital twins each communicate in pairs with one another and at least partially interchange their system requirements with each other; the digital twins compare the stored system requirements with the received system requirements; the digital twins adapt their system requirements on the basis of the comparison carried out with the received system requirements and can stipulate these as a new system requirement; and the digital twins communicate their newly stipulated system requirements to the other digital twins.

15 Claims, 3 Drawing Sheets

(56) References Cited

U.S. PATENT DOCUMENTS

| | | | |
|---|---|---|---|
| 2018/0356792 A1* | 12/2018 | Chao | G05B 19/41835 |
| 2019/0294975 A1* | 9/2019 | Sachs | G06N 3/0454 |
| 2019/0370671 A1 | 12/2019 | Martinez Canedo et al. | |
| 2019/0377333 A1 | 12/2019 | Grimm et al. | |

FOREIGN PATENT DOCUMENTS

| | | |
|---|---|---|
| CN | 109343496 A | 2/2019 |
| DE | 102016224457 A1 | 5/2018 |
| RU | 2667440 C1 | 9/2018 |
| RU | 2677702 C1 | 1/2019 |
| WO | 2018036698 A1 | 3/2018 |
| WO | WO 2018140365 A1 | 8/2018 |

OTHER PUBLICATIONS

Zhuang Cunbo et al: "Digital twin-based smart production management and control framework for the complex product assembly shop-floor", The International Journal of Advanced Manufacturing Technology, Springer, London, vol. 96, No. 1, pp. 1149-1163, XP036468995, ISSN: 0268-3768, DOI: 10.1007/S00170-018-1617-6; [gefunden am Feb. 7, 2018]; pp. 4-13; 2018.

Stark Rainer et al: "Development and operation of Digital Twins for technical systems and services", CIRP Annals, Elsevier BV, NL, CH, FR, vol. 68, No. 1, pp. 129-132, XP085731372, ISSN: 0007-8506, DOI: 10.1016/J.CIRP.2019.04.024; the whole document; 2019.

Indian Office Action dated Apr. 22, 2021 for Application No. 202044007108.

Extended European Search Report in related European Patent Application No. 19158513.2 dated Aug. 30, 2019. 15 pages.

Office Action in related Russian Patent Application No. 20200107721 dated Aug. 18, 2020. 16 pages.

* cited by examiner

SYSTEM AND METHOD FOR CHECKING SYSTEM REQUIREMENTS OF CYBER-PHYSICAL SYSTEMS

CROSS-REFERENCE TO RELATED APPLICATIONS

This application claims priority to European Application No. 19158513.2, having a filing date of Feb. 21, 2019, the entire contents of which are hereby incorporated by reference.

FIELD OF TECHNOLOGY

The following relates to a method for checking system requirements of cyber-physical systems in a composite system.

BACKGROUND

The creation of modern automated installations, for example production cells in the automotive industry or in any other desired production installation, is based on the concept of cyber-physical systems. A cyber-physical system denotes the combination of IT software components with mechanical and electronic elements which communicate via a data infrastructure, for example WLAN, LAN and/or the Internet, and is characterized by a high degree of complexity. Cyber-physical systems are formed from the networking of embedded system components by wired or wireless communication networks. Cyber-physical systems cover a wide range of possible areas in which they can be used. These include medical devices and systems, traffic control and traffic logistics systems, networked safety and driver assistance systems in the automotive sector, industrial production cells in manufacturing, energy supply management systems, infrastructure systems for telecommunications, etc.

The design of cyber-physical systems requires the integration of different components on different levels to form an overall system. Worth mentioning are the physical and electrical levels, then there are network-related requirements, event and data flow integration is also required, physical/procedural requirements should also be heeded, and the individual components should also be embedded in a control hierarchy.

When designing and developing (engineering) industrial installations, a multiplicity of areas of responsibility should therefore be taken into account, for example matters of electrics, automation, process engineering and mechanics. In this case, development work is partially carried out in a parallel manner and, on the other hand, the work is also based on one another. Normally, there is a common basis for the engineering, for example the concept, the requirements, the layout or a piping and instrument diagram and a multiplicity of mutual dependencies between the areas of responsibility. In this case, maintaining the quality as well as the coherence and consistency of the engineering solution across all areas of responsibility is difficult at the latest as soon as changes are made to the common basis or responsibility-specific decisions are made which influence other areas. It is often neither clear who needs to be informed of these decisions nor which changes are actually relevant to other areas. Therefore, the other areas are often not informed or relevant changes in an area are ignored overall since they are included in a multiplicity of items of information relating to irrelevant changes and these information notices are often distributed without a structure and without indications of their significance.

However, relevant undiscovered changes can result in far-reaching problems in the course of a project. However, such changes are often discovered only in the start-up phase, on account of problems which arise when integrating the different areas of responsibility, and accordingly often result in high costs and delays in the completion date.

It is generally true that the aim is to inform of relevant changes as early as possible. However, in this case, it should also be ensured that only the relevant changes are actually forwarded across the areas as far as possible in order to keep the outlay for capturing the changes as low as possible for the entire project.

In addition, changes occur very frequently in the design and development of industrial installations and often also cannot be avoided on account of the complexity of the projects. Stipulating a concept (design freeze) within engineering projects enables a stable basis for the subsequent work based thereon. However, changes to this basis also arise again and again over the course of a project, for example the creation of an industrial installation, and must then be accordingly implemented in the different areas of responsibility.

Therefore, changes are also usually necessary after the overall concept (design freeze) has been stipulated. In addition, errors can also arise in concept creation and likewise affect the structure and quality of the engineering solution.

Currently, there are the following solution approaches for this problem: a cross-responsibility system architecture ensures the fundamental logical and content-related relationship between the different areas of responsibility. Furthermore, the aim is to continuously check the concept within the individual areas of responsibility, or else across the areas, in order to achieve the required quality assurance.

So-called engineering tools are used for this purpose, which engineering tools document changes in the engineering solution and, if necessary, inform project collaborators about changes which have been made. Engineering tools are software tools which are used in engineering, for example for selected tasks in the area of electrics, automation and instrumentation.

However, this presupposes that an integrated tool landscape is available, with the result that all changes can be interchanged between the areas. However, this is currently not implemented for all work areas involved, or different subcontractors are involved in a project and in turn use different engineering tools. Therefore, it can be currently assumed that there is no continuous integration across all subcontractors and all work areas.

In principle, it is also possible to forward information relating to design and concept decisions or changes personally between the experts for the respective work areas by close cooperation of all work areas. However, the effects of changes on other work areas, such as a change in the electrics on the mechanics, can often be technically estimated only with difficulty, and a considerable willingness to communicate is also required between the individual collaborators and experts in the various areas, which is known to not always be present.

So-called change control boards can assess the relevance of changes. Change control boards are usually occupied by experts in the different work areas, jointly discuss changes and decide on the further procedure. However, on account of the outlay, only obviously far-reaching changes are usually discussed. The focus is often also on changes which are initiated or requested by the customer of the project, often with the aim of reducing the costs. Discussing all changes is complicated and is scarcely possible in such a framework.

Therefore, the cross-area quality assurance as well as the logical coherence and consistency of an engineering concept as well as changes in the engineering during the implementation phase are still a major problem, in particular if inconsistencies on account of changes are apparent only in the start-up phase. Comparatively long-lasting start-up phases are therefore often also used to eliminate inconsistencies and quality defects. In this case, the result may be further changes which can either be carried out directly in situ or require other more far-reaching solution approaches.

Engineering solutions can be created on the basis of largely autonomous and intelligent systems. The basic idea here is that these cyber-physical systems are combined to form a composite system in order to perform a task. For example, an industrial installation can be designed as a composite system of autonomous, intelligent cyber-physical systems, for example production cells, stations within a production line and machines, as is generally assumed in Industry 4.0 scenarios. The production cells themselves can also already constitute a group of autonomous intelligent systems, for example motors, conveyor belts, robot arms and tools. The use of a "digital twin", which simulates the state of such systems and enables evaluations with respect to the state of the system therefrom and constitutes a digital representative of these cyber-physical systems, is discussed here.

It is conventional in such a procedure to already develop a digital twin for these systems in the design phase since typically all systems are actually not yet physically present in this design phase. The physical construction of the installation normally begins only at the end of the design phase; in this case, the respective digital twin can then be accordingly assigned to its physical twin and can accompany it over the entire life cycle.

However, there has hitherto been no satisfactory solution for using artificial intelligence methods, such as the use of a digital twin, as early as in the planning phase of cyber-physical systems in order to detect contradictory or inconsistent system requirements, in particular as a result of changes in the basic concept. An assessment on the basis of the current configuration or the current state of a cyber-physical system has hitherto taken place and it is then often very complicated to carry out corrections.

SUMMARY

An aspect relates to a system and a method for checking system requirements of cyber-physical systems, which is distinguished by a high degree of reliability and safety and improved resource planning and utilization and therefore optimization in the planning phase of cyber-physical systems, or enables improved detection of inconsistencies during the implementation phase and during operation of the cyber-physical system.

According to a first aspect, embodiments of the invention relates to a method for checking system requirements of cyber-physical systems in a composite system, comprising:
    creating a digital twin for at least one cyber-physical system in each case;
    stipulating system requirements for each of the cyber-physical systems;
    storing the system requirements of the cyber-physical systems directly and/or indirectly in those digital twins which are each assigned to the cyber-physical system;
    linking at least two or more digital twins;
    wherein the linked digital twins each communicate in pairs with one another and at least partially interchange their system requirements with each other;
    wherein the digital twins compare the stored system requirements with the received system requirements;
    wherein the digital twins adapt their system requirements on the basis of the comparison carried out with the received system requirements and can stipulate these as a new system requirement; and
    wherein the digital twins communicate their newly stipulated system requirements to the other digital twins.

In one advantageous further development, the digital twins each have an engineering part which is used to engineer the associated cyber-physical system.

In a further configuration, a digital twin is created for a composite system of the cyber-physical systems, and the digital twins of the cyber-physical systems are linked to the digital twin for the composite system.

The digital twin, in the assigned cyber-physical system of which a change in a system requirement occurs, advantageously communicates this change to the other twins linked to it, and these twins compare the changed system requirement with the previous system requirements.

In a further configuration, each change in a system requirement is provided with an identifier.

The digital twins advantageously communicate with the other digital twins via a communication interface.

In a further configuration, the original system requirements of the digital twins are stored and, if a digital twin is removed from a composite system, the remaining digital twins can resort to their original system requirements.

According to a second aspect, embodiments of the invention relates to a system for checking system requirements of cyber-physical systems in a composite system; wherein a digital twin is provided for a cyber-physical system in each case and system requirements are stipulated for each of the cyber-physical systems; wherein the respective digital twin assigned to the respective cyber-physical system is designed to store the system requirements of the cyber-physical system directly and/or indirectly; wherein at least two or more digital twins are designed to be linked to one another and to each communicate in pairs with one another and to at least partially interchange their system requirements with each another; wherein the digital twins are designed to compare the stored system requirements with the received system requirements and to adapt their system requirements on the basis of the comparison carried out with the received system requirements and to be able to stipulate these as a new system requirement; and wherein the digital twins are designed to communicate their newly stipulated system requirements to the other digital twins.

In one advantageous configuration, the digital twins each have an engineering part which can be used to engineer the associated cyber-physical system.

A digital twin is advantageously provided for a composite system of the cyber-physical systems, and the digital twins of the cyber-physical systems are linked to the digital twin for the composite system.

In a further configuration, the digital twin, in the assigned cyber-physical system of which a change in a system requirement occurs, is designed to communicate this change to the other twins linked to it, and these twins are designed to compare the changed system requirement with the previous system requirements.

Each change in a system requirement is advantageously provided with an identifier.

In one advantageous further development, the digital twins have a communication interface for communicating with other digital twins.

The original system requirements of the digital twins are advantageously stored and, if a digital twin is removed from a composite system, the remaining digital twins can resort to their original system requirements.

According to a third aspect, embodiments of the invention relates to a computer program product (non-transitory computer readable storage medium having instructions, which when executed by a processor, perform actions) which contains one and/or more executable computer codes for carrying out the method.

BRIEF DESCRIPTION

Some of the embodiments will be described in detail, with references to the following Figures, wherein like designations denote like members, wherein.

DETAILED DESCRIPTION

Figure 1:
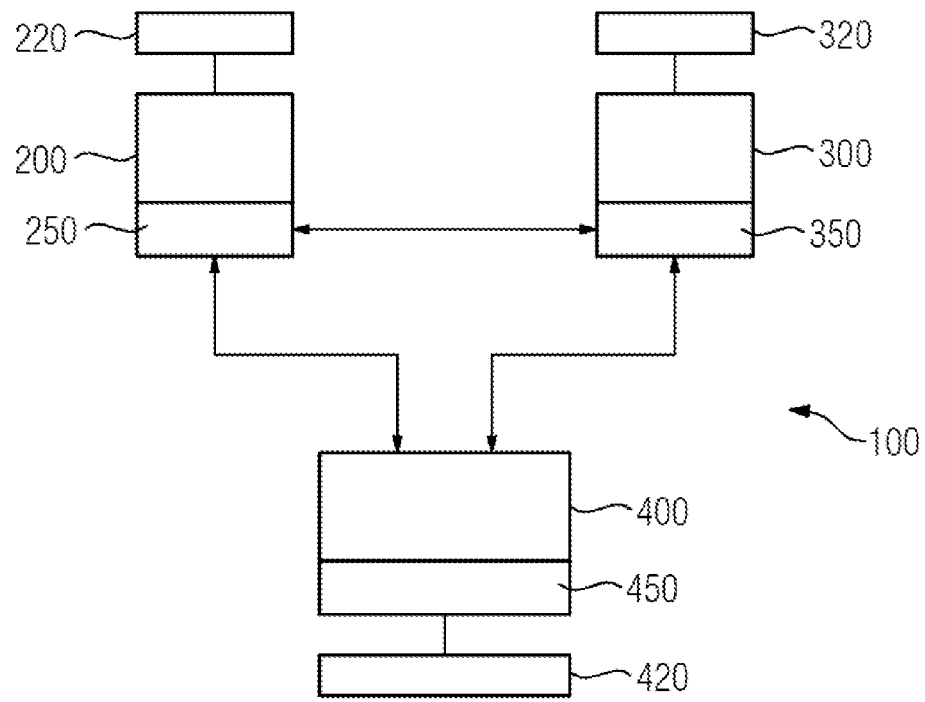
FIG. 1 shows an overview illustration for explaining a system according to embodiments of the invention.

FIG. 1 shows a system 100 having three digital twins 200, 300, 400. Each of the digital twins 200, 300, 400 is a digital mirror image of a cyber-physical system 220, 320, 420 and is used, in particular, to use simulation models to optimize the sequence of operating the respective cyber-physical system 220, 320, 420, such as an industrial installation.

Each digital twin 200, 300, 400 also contains an engineering part 250, 350, 450 which can be used to engineer the cyber-physical system 220, 320, 420 and to combine the plurality of cyber-physical systems 220, 320, 420 to form a composite system. This engineering part contains all engineering information relating to the cyber-physical system, including documentation, so that the cyber-physical system can be used in an engineering solution, such as a composite system, for example a production installation. If the cyber-physical system is integrated in a composite system, the cyber-physical system provides its interfaces, for example the type of electrical connections, pipeline connections etc., as well as its documentation. Different cyber-physical systems can then be integrated in a cyber-physical composite system by means of the mutual use of interfaces.

Engineering tools are used in this case. All information relating to a cyber-physical system 220, 320, 420 can therefore be stored and pooled in the respective digital twin 200, 300, 400. In particular, both requirements of the cyber-physical system 220, 320, 420 imposed on its environment and boundary conditions for using the system 220, 320, 420 or particular properties can be explicitly documented. Such requirements imposed on the environment or properties can comprise environmental conditions, for example temperature ranges within which the cyber-physical system 220, 320, 420 operates reliably. Another example is the earthquake safety of a cyber-physical system 220, 320, 420. In addition, technical requirements, for example the electrical voltage level, required specifications of electrical and mechanical connections, for example pipelines to be connected, the use of particular data formats for transmitting data, the dependencies with respect to other cyber-physical systems 220, 320, 420 in the composite system (for example, a system 220, 320, 420 requires knowledge of the ambient temperature from an external temperature sensor) are important.

These system requirements are documented by means of a machine-readable language. These can be implemented as follows, for example:

Temp_min=4° C.

Temp_max=30° C.

Data_Format=ASCII

For such documentation, a general definition of the keywords and their ranges of values is required, for example by means of the use of an ontology.

Figure 2:
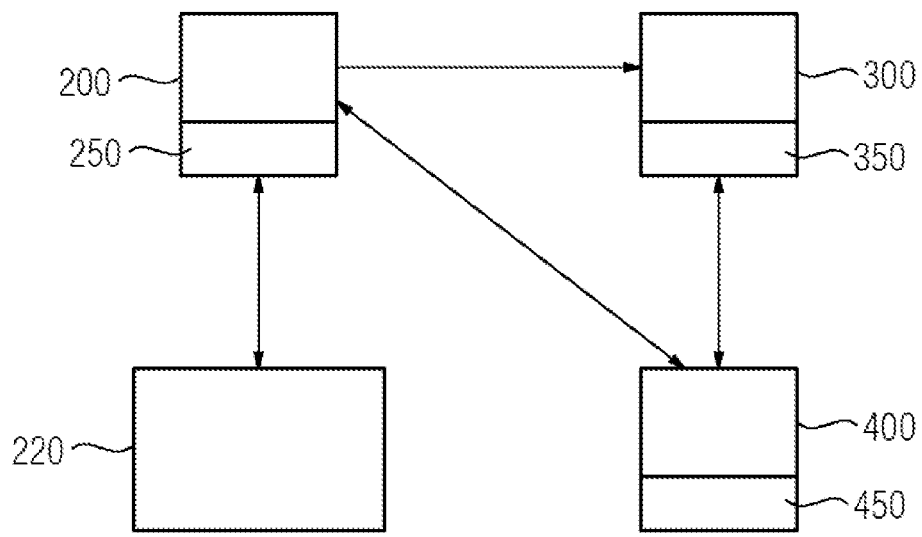
FIG. 2 shows a block diagram for explaining an implementation detail of the system according to embodiments of the invention.

In FIG. 2, of the three digital twins 200, 300, 400, the twin 200 is already connected to an actually existing cyber-physical system 220. This digital twin 200 can make decisions regarding the cyber-physical system 220. Since it is connected to the other digital twins 300, 400, a decision can also be made in consultation with the other two twins 300, 400.

According to embodiments of the present invention, the communication between the digital twins 200, 300, 400 enables support when creating an installation concept which is coherent per se and when assessing the relevance of changes within a cyber-physical system 220 and their effects on connected cyber-physical systems 320, 420.

The digital twins 200, 300, 400 can communicate with one another, for example, via generically defined, general interfaces, which allows, on the one hand, the requirements of a cyber-physical system 220, 320, 420 to be queried and, on the other hand, requirements and their value sum to be communicated by means of the dissemination to other digital twins 200, 300, 400. An example is described below:

Read requirement (<name of the requirement>)

Disseminate requirement (<identity of the dissemination>, <name of the requirement>, <value of the requirement>)

This method can also be used if the requirements are changed. In particular, the creation of an engineering solution can already be considered to be a sequence of changes. If the engineering solution is subsequently changed, the underlying method of the communication between the digital twins 200, 300, 400 is unchanged.

One further development of embodiments of the invention provides for the digital twins 200, 300, 400 to be linked to one another in an area-specific manner in engineering tools. Each work area can define the system requirements respectively relating to it in the digital twin 200, 300, 400. Engineering areas and/or responsibilities can be assigned to the system requirements. Persons who need to be informed in the event of an inconsistency can then be assigned to the engineering areas and/or responsibilities in a software application. This ensures that the inconsistencies are indicated to the relevant persons in a targeted manner.

These checks are carried out by linking the digital twins 200, 300, 400 to one another. In this case, the digital twins 200, 300, 400 reciprocally check their requirements which are stored in the engineering part 250, 350, 450. The digital twin 200 can thus ask the digital twins 300, 400 linked to it for their requirements in each case and can compare these requirements with its own requirements and/or can communicate its requirements to the other twins 300, 400 in each case. If one of the other digital twins 300, 400 has more restricted requirements, the digital twin 200 can adapt its requirements in such a manner that they are congruent with the requirements of the other digital twins 300, 400 and forwards these new adapted requirements to the other twins 300, 400.

If the requirements of the digital twin 200 itself are more restricted, it forwards its own requirements to the respectively linked digital twins 300, 400 for comparison. In this case, it is also possible for a comparison to take place only with a subset of the twins 300, 400. For example, a temperature range of 0-50° C. can be provided for the cyber-physical system 220, in which this system 220 is intended to be able to operate, whereas a temperature range of 10-20° C. is determined for the cyber-physical system 320. The composite system of the two cyber-physical systems 220, 320 could then operate in a temperature range of 10-20° C. The digital twin 200 is assigned to the cyber-physical system 220, whereas the cyber-physical system 320 is represented by the digital twin 300. The digital twin 200 therefore compares its temperature range with the digital twin 300. In this case, it is determined that the common temperature range is 0-20° C. which is then increased in accordance with the standard or standard system requirement since both the cyber-physical system 220 and the cyber-physical system 320 can operate in this temperature range. After the new temperature range has been determined, the digital twin 200 forwards this changed requirement to all connected digital twins 300, 400 which in turn check and continue to use this system requirement.

Since the cyber-physical systems 220, 320, 420 are often strongly networked to one another within a composite system and a change in a system requirement for the cyber-physical system 220 can therefore also affect the other cyber-physical systems 320, 420, one embodiment provides for the changes to be documented and to be connected using a ticket method in order to prevent changes being processed repeatedly. Each change in a system requirement of a cyber-physical system 220, 320, 420 is provided with a unique identity, for example a global unique identifier, by the respective digital twin 200, 300, 400. As soon as a changed requirement is forwarded for the first time, it receives a uniquely assignable identity.

If a change arises, for example, for the cyber-physical system 220, the digital twin 200 allocates an identifier and forwards the identity of the change, together with the change notification, to the respective other digital twins 300, 400. If such a change notification now arrives at a digital twin 300, 400, a check is first of all carried out, on the basis of a database which can be centrally accessed by the digital twins 300, 400 or is locally stored in the digital twins 200, 300, in order to determine whether a new request is involved or this request has already been processed. In the second case, the request is not processed any further and, in the first case, the digital twins 300, 400 compare the change with their requirements and forward the results to the digital twin 200. It may be sufficient if the database comprises only the last requests in order to thus reduce the storage requirement. However, this is dependent on the type and structure of the cyber-physical systems 220, 320, 420 and can be adapted accordingly.

If the digital twin 200 determines inconsistencies for the installation concept or a partial concept of the cyber-physical system 220 on the basis of the check with the other digital twins 300, 400, the task of the digital twin 200 is to check the requirements of the installation concept and, if necessary, to inform of inconsistencies on account of changes which have been made to the installation concept. Inconsistencies arise when system requirements cannot be brought in line with one another and contradictions therefore arise. For example, a composite system has hitherto been operating in the low-voltage range and a further cyber-physical system in the high-voltage range is then added, with the result that a contradiction arises and must be resolved.

This can be effected by informing the responsible development engineer by text messages or by marking the inconsistencies in color in the engineering concept, for example in the electrical plan, in automation diagrams or in the layout. Such discrepancies and inconsistencies can generally be resolved only by an appropriate expert, for example a development engineer. This can also be carried out at a later time, in which case inconsistencies are partially also clarified by means of further changes.

In order to usefully limit the distribution of the changes to all linked digital twins 200, 300, 400, limit values for forwarding changes can be statically stored or dynamically calculated. For example, it can be stipulated that a temperature deviation of 5 degrees is not a change and therefore the digital twins 200, 300, 400 need not be provided with any further information. Alternatively, it can be stipulated that the changes are intended to be distributed further only when the change is above a stipulated limit value.

As soon as the actual cyber-physical systems 220, 320, 420 are integrated to form a composite system, generated data may likewise be assigned to the digital twins 200, 300, 400. For example, temperature sensors can forward their currently measured values to the digital twins 200, 300, 400. These measured values are then compared with the system requirements. If limit values are exceeded, this can result in the triggering of warnings or corresponding alarms. Furthermore, the assumed system requirements can be checked by means of the actually generated data.

In a composite system, different limit values may exist for a measurement parameter. For example, it may be useful to stipulate a common temperature range for all cyber-physical systems 220, 320, 420 in a production hall. However, if a composite system extends over a plurality of production halls, for example, it may be useful to stipulate a different temperature range for each individual production hall since one hall could be air-conditioned in contrast to the remaining halls. Energy transmission installations are a further example since parts of an energy transmission installation must be protected here from environmental influences, whereas this is not necessary for other parts.

It is also possible for a plurality of composite systems to in turn be combined to form a higher unit, wherein each composite system comprises its own requirements. These requirements are now in turn compared on the level of the higher unit or within a particular subset of composite systems. Different organizational principles with regard to how cyber-physical systems are connected to one another and interact with one another are therefore possible within embodiments of the present invention. Systems or their digital twins 200, 300, 400 can therefore be assigned to defined groups and/or classes which are then compared with respect to particular selected requirements or all requirements only within this group and/or class. Whether these groups and/or classes of system requirements are forwarded to other digital twins N depends on whether these digital twins N are linked to the digital twins 200, 300, 400 and have been assigned to the same group/class with respect to the system requirements.

For example, a system 220 or its digital twin 200 can be assigned, with respect to the requirements imposed on the ambient temperature, to a group A which comprises all systems which are located in a hall A. In contrast, the same system 220 or its digital twin 200 may be assigned to a further group B having a requirement "low voltage". With respect to the requirement with regard to the ambient temperature, the changes are agreed only with systems in group A, but, with respect to the requirements imposed on the voltage level, the changes are agreed with all systems in group B.

A group assignment of the systems can be achieved by means of substructures within the composite systems. Alternatively, it is possible for systems to be assigned to different groups or classes with respect to stipulated prerequisites by means of an engineering tool.

Figure 3:
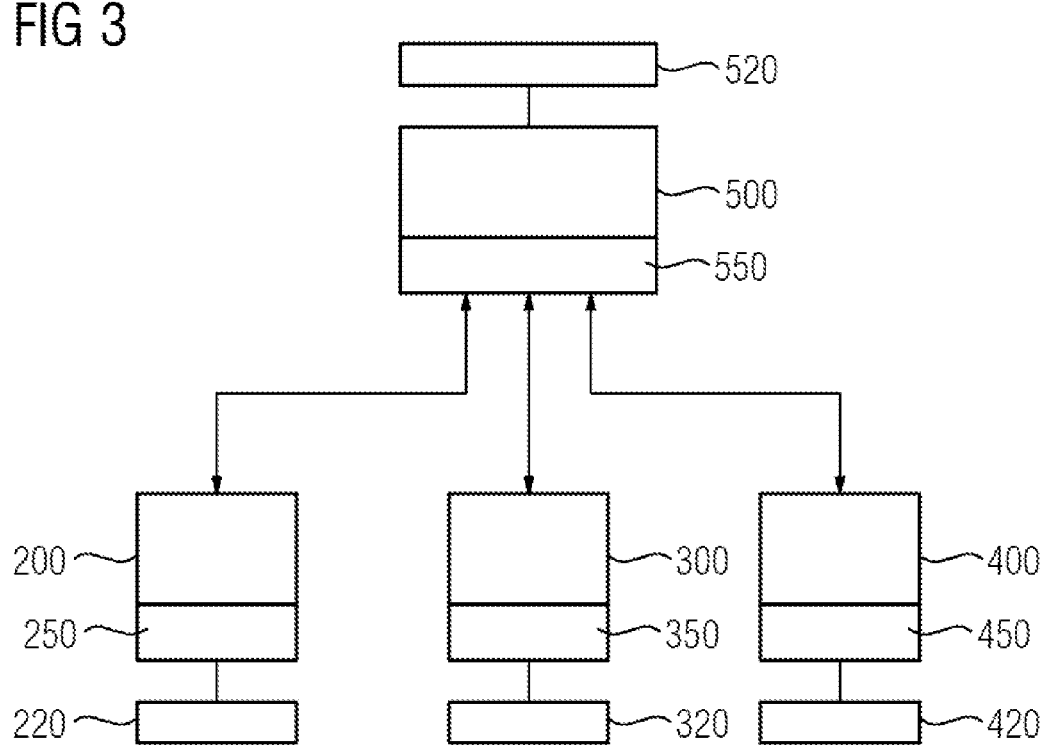
FIG. 3 shows a block diagram for explaining a further implementation detail of the system according to embodiments of the invention.

So that all changed prerequisites are reliably distributed in the entire composite system, there are at least two implementation possibilities:

As illustrated in FIG. 3, an additional digital twin 500 may be provided for a composite system 520 consisting of the cyber-physical systems 220, 320, 420. The digital twin 500 may also be in the form of a central database. The digital twin 500 contains the requirements of the composite system 520. Within the scope of an engineering project, it is also possible for the requirements imposed on the composite system 520 to be initially stipulated and for it then to emerge, over the course of the project, which and how many other cyber-physical systems 220, 320, 420 are intended to be integrated in the composite system 520. The digital twin 500 of the composite system 520 can be used to manage the composite system 520 and is used to integrate the connected cyber-physical systems 320, 420, 520. In particular, the digital twin 500 can identify conflicts with a central requirement when integrating the cyber-physical systems 220, 320, 420.

Each time a digital twin 200, 300, 400 is integrated in the composite system 520, the digital twin 500 of the composite system 520 must be informed, in which case such information can also be effected automatically when docking a digital twin 200, 300, 400 to the digital twin 500 of the composite system 520. Furthermore, according to embodiments of the present invention, all further digital twins 200, 300, 400 which have already been linked to the digital twin 500 of the composite system are informed in order to uncover any inconsistencies.

It may arise that the digital twin 200 complies with a selected temperature range of the composite system 520, whereas this requirement is not complied with by the digital twins 300, 400.

In the exemplary embodiment of embodiments of the invention already illustrated in FIG. 1, completely autonomously acting digital twins 200, 300, 400 are involved since a digital twin is not provided for a composite system consisting of the cyber-physical systems 220, 320, 420. In this variant, each digital twin 200, 300, 400 has the most comprehensive possible image of the prerequisites of the composite system since each digital twin 200, 300, 400 derives the requirements of the composite system from all previously requested requirements and stores them.

For example, in the case of earthquake safety, the composite system would be earthquake-proof until the first non-earthquake-proof cyber-physical system 420 is added. In the case of the temperature ranges, the temperature range of the composite system would be the overlap of the temperature ranges of all cyber-physical systems 220, 320, 420 in the composite system.

Figure 4:
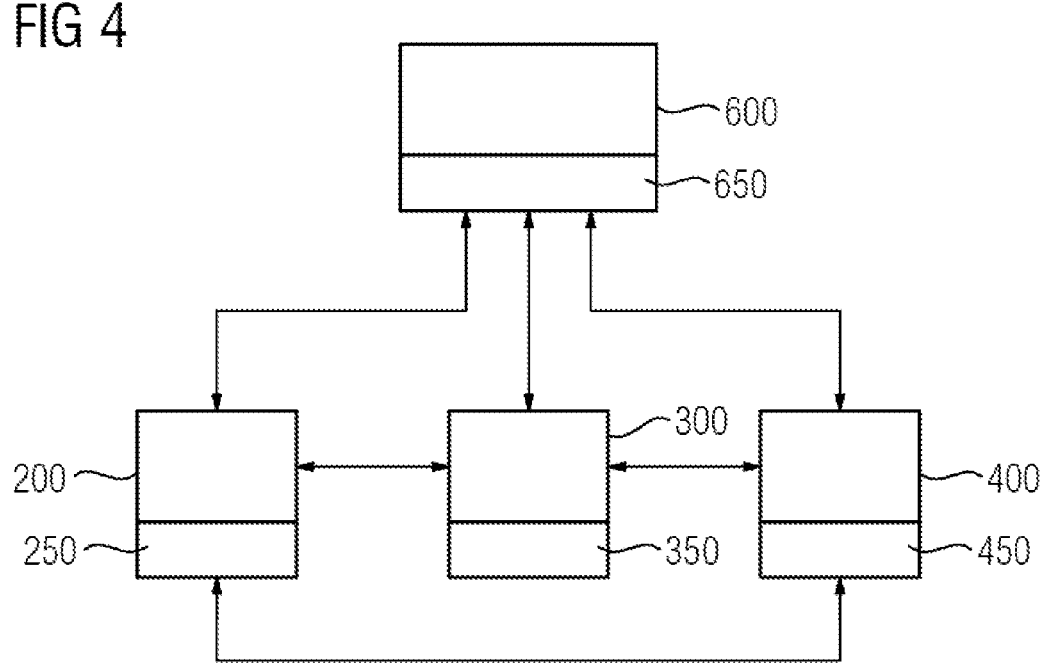
FIG. 4 shows a block diagram for explaining a further implementation detail of the system according to embodiments of the invention.

As illustrated in FIG. 4, if a new digital twin 600 is newly linked to the already existing digital twins 200, 300, 400, all directly and indirectly linked digital twins 200, 300, 400 are compared with one another. The result of such a comparison is therefore the overlap of the system requirements of the composite system consisting of the cyber-physical systems 220, 320, 420, 620.

The determined system requirements can be analyzed and graphically presented by means of a software application which can be installed in a central monitoring device or in a decentralized manner. For the temperature range for example, it is possible to carry out an analysis which indicates those systems which are suitable only for a restricted temperature range. The respective cyber-physical systems can then be adapted on the basis of this information or adaptations are made in the environment, such as air-conditioning.

It is also advantageous to regularly check a composite system 520 by the digital twins 200, 300, 400 in order to detect, for example, possible failures in the composite system 520 or wear-related changes.

Provision may also be made to remove one or more digital twins 200, 300, 400 again, for example the twin 200. The other remaining digital twins 300, 400 then resort again to their original system requirements which were valid before being combined with the digital twin(s) 200 which has/have now been removed. This means that a digital twin 200, 300, 400 adapts its system requirements when combined with other digital twins 200, 300, 400, but still retains its own original system requirements. If a digital twin 200 is removed, the original system requirements are available again in order to determine the system requirements for a new composite system without this digital twin 200. The removal of a digital twin 200 is communicated to the other remaining twins 300, 400, for example by means of a logoff with corresponding communication protocols.

If a digital twin 200 is removed, for example by a system operator, the remaining digital twins 300, 400 carry out a new comparison and check the previous system requirements in order to determine whether the requirements can remain or whether a change is necessary.

Figure 5:
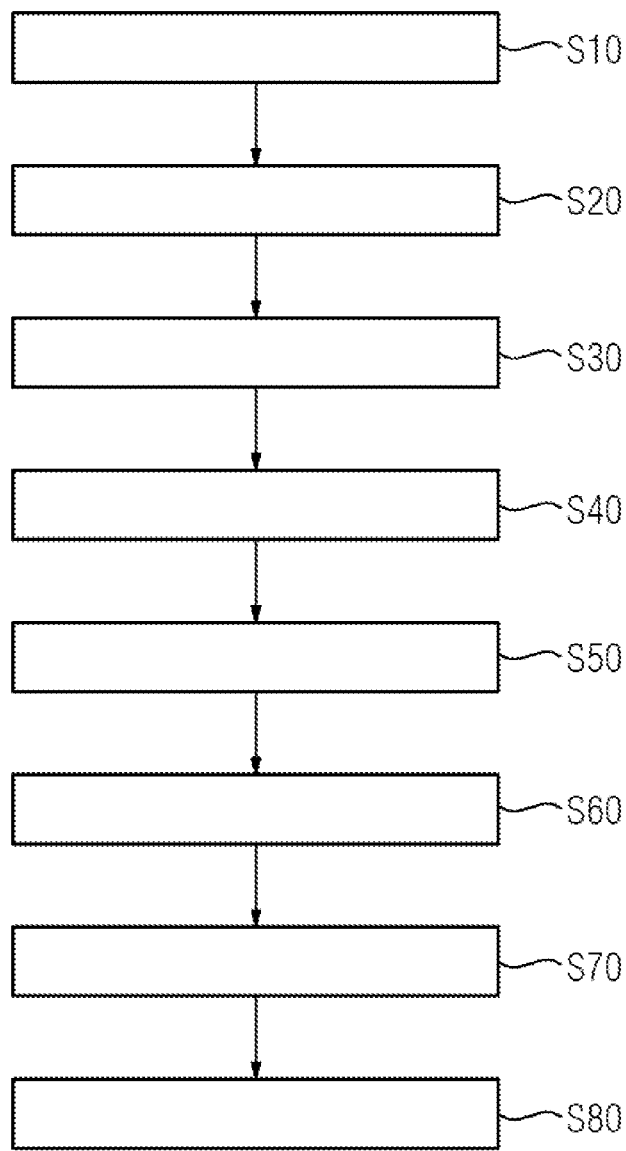
FIG. 5 shows a flowchart for explaining a method according to embodiments of the invention.

FIG. 5 shows a flowchart of a method according to embodiments of the invention for checking system requirements of cyber-physical systems 220, 320, 420.

In step S10, a digital twin 200, 300, 400 is created for a cyber-physical system 220, 320, 420 in each case.

In step S20, system requirements are stipulated for each of the cyber-physical systems 220, 320, 420.

In step S30, the system requirements of a cyber-physical system 220, 320, 420 are stored directly and/or indirectly in the digital twin 200, 300, 400 assigned to the respective cyber-physical system.

In step S40, at least two or more digital twins 200, 300, 400 are linked to one another.

In step S50, the digital twins 200, 300, 400 which have been linked to one another each communicate in pairs with one another and at least partially interchange their system requirements with each other.

In step S60, the digital twins 200, 300, 400 each compare their stored system requirements with the received system requirements.

In step S70, the digital twins 200, 300, 400 adapt their system requirements on the basis of the comparison carried out with the received system requirements and can stipulate these as a new system requirement.

In step S80, the digital twins 200, 300, 400 communicate their newly stipulated system requirements to the other digital twins 200, 300, 400.

Figure 6:
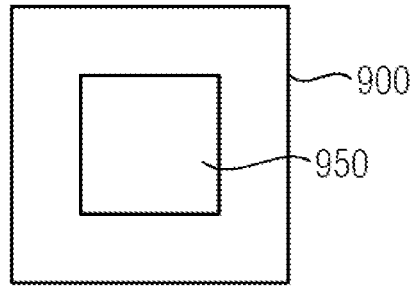
FIG. 6 shows a schematic illustration of a computer program product according to embodiments of the invention.

FIG. 6 schematically illustrates a computer program product 900 which contains one and/or more executable computer codes 950 for carrying out the method according to the first aspect of embodiments of the invention.

According to embodiments of the present invention, the coherence and consistency of an engineering solution are continuously ensured in the case of changes of significant system requirements on the basis of predefined or dynamically changing values by comparing digital twins 200, 300, 400 which are linked to one another. The prerequisite is the creation of a digital twin 200, 300, 400 for each cyber-physical system 220, 320, 420, in which the requirements for the respective cyber-physical system 220, 320, 420 are recorded.

The choice of the system requirements which are considered to be significant is stipulated across the areas. In this case, both comprehensive and area-specific system requirements can be defined.

As a result of embodiments of the present invention, important requirements of installation concept for a composite system consisting of a plurality of cyber-physical systems 220, 320, 420 are continuously checked and can be transparently indicated at any time. In addition, effects of changes of a cyber-physical system on other cyber-physical systems 220, 320, 420 can be immediately made visible, as a result of which time and costs can be saved in the case of complex composite systems.

Although the present invention has been disclosed in the form of preferred embodiments and variations thereon, it will be understood that numerous additional modifications and variations could be made thereto without departing from the scope of the invention.

For the sake of clarity, it is to be understood that the use of 'a' or 'an' throughout this application does not exclude a plurality, and 'comprising' does not exclude other steps or elements.

The invention claimed is:

1. A method for checking system requirements of cyber-physical systems in a composite system, the method comprising:
    creating a digital twin for each of cyber-physical system;
    stipulating system requirements for each of the cyber-physical systems;
    storing the system requirements of respective cyber-physical systems directly and/or indirectly in respective digital twins which are each assigned to each of the cyber-physical system; and
    linking at least two or more digital twins;
    wherein the linked digital twins each communicate with one another and at least partially interchange respective system requirements with each other;
    wherein the linked digital twins are configured to compare the stored system requirements with the interchanged respective system requirements and determine a most restricted requirement of the linked two or more digital twins;
    wherein the linked digital twins are configured to adapt the stored system requirements on a basis of the comparison carried out with the interchanged respective system requirements and stipulate the adapted system requirements as a new system requirement, wherein the adapted system requirements are congruent with the most restricted requirement;
    wherein at least one of the linked digital twins is configured to communicate the new system requirements to at least one other digital twin of the linked digital twins.

2. The method as claimed in claim 1, wherein each digital twin has an engineering part which is used to engineer an associated cyber-physical system.

3. The method as claimed in claim 1, wherein a composite digital twin is created for the composite system of the cyber-physical systems, and the linked digital twins of the cyber-physical systems are linked to the composite digital twin for the composite system.

4. The method as claimed in claim 1, wherein the respective digital twin, in the assigned cyber-physical system of which a change in the stored system requirements occurs, communicates the change to the at least one other digital twin linked to the digital twin, and the linked digital twins compare the changed system requirement with previous system requirements.

5. The method as claimed in claim 4, wherein each change in the stored system requirements is provided with an identifier.

6. The method as claimed in claim 1, wherein the linked digital twins each communicate with the at least one other digital twin via a communication interface.

7. The method as claimed in claim 1, wherein the original system requirements of the linked digital twins are stored and, if a respective digital twin is removed from the composite system, the remaining at least one other digital twin can resort to original system requirements.

8. A system for checking system requirements of cyber-physical systems in a composite system comprising:
    a plurality of cyber-physical systems;
    a respective digital twin for each respective cyber-physical system of the plurality of cyber-physical systems, wherein system requirements are stipulated for each of the respective cyber-physical system;
    wherein the respective digital twin assigned to the respective cyber-physical system is configured to store the system requirements of the respective cyber-physical system directly and/or indirectly;
    wherein at least two or more digital twins are configured to be linked to one another and to each communicate in pairs with one another and to at least partially interchange respective system requirements with each another;
    wherein the linked digital twins are configured to compare the stored system requirements with the interchanged respective system requirements and determine a most restricted requirement of the linked two or more digital twins, further wherein the linked digital twins are configured to adapt the stored system requirements on a basis of the comparison carried out with the interchanged respective system requirements and to be able to stipulate the adapted system requirements as a new system requirement, wherein the adapted system requirements are congruent with the most restricted requirement; and
    wherein at least one of the linked digital twins is configured to communicate the new system requirements to at least one other digital twin of the linked digital twins.

9. The system as claimed in claim 8, wherein each digital twin has an engineering part which can be used to engineer an associated cyber-physical system.

10. The system as claimed in claim 8, wherein a composite digital twin is provided for the composite system of the cyber-physical systems, and the linked digital twins of the cyber-physical systems are linked to the composite digital twin for the composite system.

11. The system as claimed in claim 8, wherein the respective digital twin, in the assigned cyber-physical system of which the change in the stored system requirements occurs, is configured to communicate the change to the at least one other digital twin linked to the digital twin, and the linked digital twins are configured to compare the changed system requirement with previous system requirements.

12. The system as claimed in claim 11, wherein each change in the stored system requirements is provided with an identifier.

13. The system as claimed in claim 8, wherein the linked digital twins have a communication interface for communicating with the at least one other digital twin.

14. The system as claimed in claim 8, wherein original system requirements of the linked digital twins are stored and, if a respective digital twin is removed from the composite system, the remaining at least one digital twin can resort to original system requirements.

15. A computer program product, comprising a computer readable hardware storage device having computer readable program code stored therein, said program code executable by a processor of a computer system to implement a method as claimed in claim 1.

* * * * *